US012710352B2

(12) United States Patent
Magnin

(10) Patent No.: US 12,710,352 B2
(45) Date of Patent: Aug. 18, 2026

(54) OPTICAL FLOW CYTOMETER FOR FLUORESCENCE AND SCATTERING MEASUREMENTS BY SEGMENTATION OF BEAM EMITTED BY A SINGLE NON-COHERENT LIGHT SOURCE

(71) Applicant: BIT GROUP FRANCE, Montpellier (FR)

(72) Inventor: Olivier Magnin, Theys (FR)

(73) Assignee: BIT GROUP FRANCE, Montpellier (FR)

( * ) Notice: Subject to any disclaimer, the term of this patent is extended or adjusted under 35 U.S.C. 154(b) by 0 days.

(21) Appl. No.: 19/137,981

(22) PCT Filed: Dec. 20, 2022

(86) PCT No.: PCT/IB2022/000736
§ 371 (c)(1),
(2) Date: Jun. 11, 2025

(87) PCT Pub. No.: WO2024/134240
PCT Pub. Date: Jun. 27, 2024

(65) Prior Publication Data

US 2026/0016395 A1 Jan. 15, 2026

(51) Int. Cl.
*G01N 15/1434* (2024.01)
*G01N 15/14* (2024.01)
(Continued)

(52) U.S. Cl.
CPC ..... *G01N 15/1434* (2013.01); *G01N 15/1459* (2013.01); *G01N 21/47* (2013.01);
(Continued)

(58) Field of Classification Search
CPC .. G01N 15/01; G01N 15/0211; G01N 15/075; G01N 15/14; G01N 15/1434;
(Continued)

(56) References Cited

U.S. PATENT DOCUMENTS 3,675,768 A * 7/1972 Legorreta-Sanchez ...................... G06M 1/101 435/6.12
3,819,270 A * 6/1974 Hirschfeld ............... G01N 1/38 356/343
(Continued)

FOREIGN PATENT DOCUMENTS

JP H11326773 A * 11/1999
WO 2019058152 A1 3/2019

OTHER PUBLICATIONS

International Search Report and Written Opinion received for PCT/IB2022/000736, mailed Jun. 30, 2023.
(Continued)

*Primary Examiner* — Gordon J Stock, Jr.
(74) *Attorney, Agent, or Firm* — Greer, Burns & Crain, Ltd

(57) ABSTRACT

An optical flow cytometer for fluorescence and scattering measurement includes a non-coherent light source generating an illumination beam; and a beam truncation device having: a first passage accommodating a first part of the illumination beam with a first divergence, the first part performing scattering measurements; a second passage accommodating a second part of the illumination beam with a second divergence, the second part being dedicated to fluorescence measurements; the second divergence being greater than the first divergence; the first and second passages separated by a beam truncation device area that stops illumination beam; a focalization lens focusing the first part and the second part of the illumination beam on a flowcell having an interrogation zone; a scattering detector receiving light scattered from the first illumination beam part as a particle crosses the interrogation zone; and a fluorescent
(Continued)

detector receiving fluorescent light emitted by the particle crossing the interrogation zone.

14 Claims, 2 Drawing Sheets

(51) Int. Cl.
*G01N 21/47* (2006.01)
*G01N 21/64* (2006.01)

(52) U.S. Cl.
CPC ..... *G01N 21/64* (2013.01); *G01N 2015/1447* (2013.01); *G01N 2015/1477* (2013.01)

(58) Field of Classification Search
CPC ........... G01N 15/1436; G01N 15/1459; G01N 15/1484; G01N 15/149; G01N 2015/0038; G01N 2015/1006; G01N 2015/1447; G01N 2015/145; G01N 2015/1452; G01N 21/85; G01N 21/64; G01N 21/47; G01N 21/49; G01N 21/53; G01N 2015/6463; G01N 2015/6465; G01N 2015/6467; G01N 2015/6471; G01N 2015/6473; G01N 2015/6476; G01N 2015/6491; G01N 2015/4704; G01N 2015/4707; G01N 2015/4709; G01N 2015/4711; G01N 2015/4728; G01N 2015/1734; G01N 2015/1738; G01N 2015/174; G02B 21/10; G02B 21/12; G02B 21/125
See application file for complete search history.

(56) References Cited

U.S. PATENT DOCUMENTS 3,822,095 A * 7/1974 Hirschfeld ......... G01N 15/1433 250/573
4,585,315 A * 4/1986 Sincerbox ............ G02B 21/125 359/861
5,325,231 A * 6/1994 Tamura ................ G02B 21/088 359/387
5,580,162 A * 12/1996 Murakami ......... G01N 21/8806 362/322
5,838,502 A * 11/1998 Park ..................... G11B 7/1374 369/112.28
6,243,197 B1 * 6/2001 Schalz ................ G02B 21/088 359/368
6,633,662 B2 * 10/2003 Ravkin .............. G01N 15/1433 382/133
6,839,166 B2 * 1/2005 Fukushima .......... G02B 21/086 359/368
7,688,505 B2 * 3/2010 Vodyanoy ............. G02B 5/005 359/368
8,466,435 B2 * 6/2013 Toishi .................. G01N 15/147 250/458.1
8,687,190 B2 * 4/2014 Dowaki ............. G01N 15/1434 356/337
9,453,995 B2 * 9/2016 Clark ..................... G02B 21/08
9,846,111 B2 * 12/2017 Pristinski ........... G01N 15/1404
9,885,603 B2 * 2/2018 Morrell ................. G01J 1/0488
10,260,858 B2 * 4/2019 Martini ................ G01B 11/043
10,359,349 B2 * 7/2019 Gabriel .............. G01N 15/0211
10,451,482 B2 * 10/2019 Martini ..................... G01J 3/51
11,972,620 B2 * 4/2024 Li ........................ G06V 20/695
12,222,486 B2 * 2/2025 Feng .................... G02B 27/141
12,298,489 B2 * 5/2025 Putman .................. G02B 21/16
12,339,217 B2 * 6/2025 Imai ................... G01N 15/1434
12,366,526 B2 * 7/2025 Ohno ................... G01N 21/455
2008/0204717 A1 8/2008 Trainer
2011/0222050 A1 9/2011 Suzuki et al.
2013/0107279 A1 * 5/2013 Yamaguchi ........... G03F 9/7069 250/492.1
2015/0260628 A1 * 9/2015 Shamir .............. G01N 15/1436 356/73
2023/0266229 A1 * 8/2023 Imai ................... G01N 15/1459 435/288.7
2024/0280467 A1 * 8/2024 Adachi ................ G01N 15/149

OTHER PUBLICATIONS

International Preliminary Report on Patentability received for PCT/IB2022/000736, mailed Mar. 28, 2025.

* cited by examiner

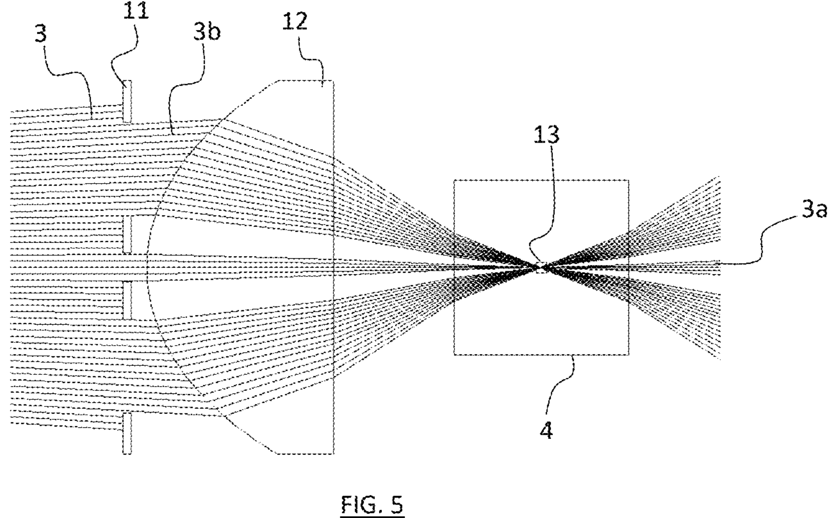
FIG. 5
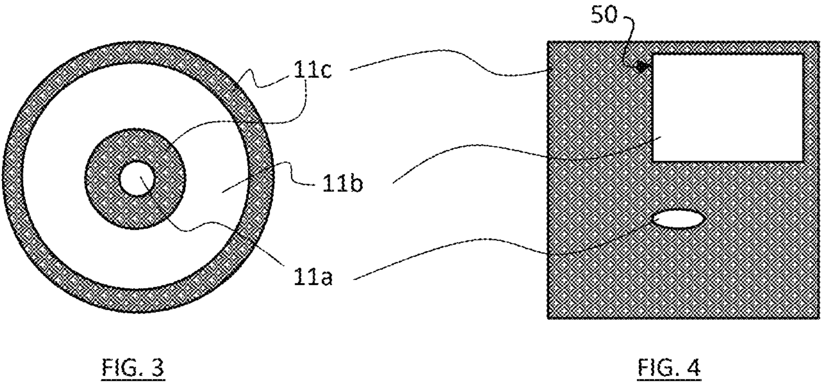
FIG. 3
FIG. 4

OPTICAL FLOW CYTOMETER FOR FLUORESCENCE AND SCATTERING MEASUREMENTS BY SEGMENTATION OF BEAM EMITTED BY A SINGLE NON-COHERENT LIGHT SOURCE

BACKGROUND

The present invention relates to an optical flow cytometer for blood cell characterization by fluorescence measurement and scattering measurement on a blood cells flow. It concerns the field of automatic devices for the counting and characterization of particles suspended in a liquid medium, and more particularly the field of haematology instruments for counting and characterizing the various types of cells contained in a blood sample, such as white blood cells, red blood cells and platelets as well as other types of particles such as algae, bacteria, . . .

The state of the art and the proposed invention thus relate to devices for counting and characterizing various types of cells contained in a blood sample and for determining their relative distribution within various subpopulations based on light scattering and fluorescence.

It is known to use LED source in an optical flow cytometer to perform scattering measurement and fluorescence measurement.

The scattering measurement in such an arrangement implies some constraints.

Unlike fluorescence, single cell scattering is highly non-isotropic. Single cell scattering measurement not only depends on the cell parameter to be measured, but also on the illumination beam geometry.

Light intensity scattered by a single cell rapidly fades with increase of scattering angle, and it is also known to reflect very different cell parameters depending on the angle of collected scattered rays.

The person skilled in the art knows that light scattered by a single blood cell at small angle reflects its size. Whereas light scattered at right angle depends on the blood cell internal complexity (nucleus lobes number, granularity, . . . ).

Furthermore, it is also obvious for skilled person in the art, that scattered light can only be measured beyond illumination beam divergence. If illumination beam has half-cone divergence of $\alpha$ (alpha) with respect to the optical axis, scattered light must be collected from angle no less than $\alpha$ (alpha). Otherwise part of the illumination beam would also be collected. As a consequence, the scattering angle is not defined from the optical axis but from the illumination beam divergence half-cone.

Single cell scattering is strongly non-isotropic, light intensity scattered at small angle, for example<10 deg (measured from the illumination beam divergence half-cone) is quite strong. Whatever the light source is, no particular sensitivity is required for the photo-detector. A standard photodiode is common on flow cytometry optical setups for measuring small angle scattering. Intensity of the illumination beam is not a critical parameter for measurements of small angle scattering by a single blood cell.

Accordingly, single cell scattered light collection direction depends on:

illumination beam divergence, and cell parameter to be measured (size or complexity).

The fluorescence measurement also implies some constraints.

Flow cytometry can heavily rely on fluorescence measurements for blood cells fine characterization. A dye binds to a specific cell characteristic (such as its nucleic acids contents) and emits fluorescence light when illuminated at appropriate wavelength.

Fluorescent dyes are known to have rather low emission to excitation ratio. Fluorescence light emission is typically very faint and requires high sensitivity photodetector like photomultiplier (PMT), Silicon PhotoMultiplier (SiPM) or avalanche photodiodes (APD).

Fluorescent light emission intensity is also proportional to dye excitation (or illumination) intensity. It is then advantageous to have the highest possible intensity for excitation (or illumination) so that fluorescence light emission is also maximized.

Since light emission by fluorescence is very faint, it is also advantageous to maximize collection of fluorescence light using high Numerical Aperture (N.A.) lens (or group of lenses).

Fluorescence is known to be an isotropic light emission. It gives similar results whatever fluorescent light collection direction is.

Accordingly, fluorescence measurement constraints are as follows:

highest possible illumination (excitation) intensity, and largest possible Fluorescence light collection.

The use of an extended non-coherent light source also implies some constraints.

Unlike lasers, high power LEDs are extended highly divergent light sources. So an high numerical aperture (NA) optics is required to maximize light collection efficiency. Since flow cytometry optical setup must focus the excitation beam into the flowcell (at the interrogation zone), high numerical aperture (NA) focusing optics is also required to handle the highly divergent beam.

Accordingly, the LED constraint is based on high divergence illumination (i.e. excitation) beam:

high NA focalization lens, and high NA scattering collection lens.

To maximize illumination (excitation) of the fluorescent dye, it is thus mandatory to use high NA optics both for LED source light collection and focalization. As a consequence of the highly divergent excitation beam through the flowcell, high NA optics are also required for measurement of forward scatter because scattering must be measured beyond illumination beam divergence.

Since fluorescence light measurement also requires high NA optics, all optical functions (source focalization, forward scattering (FSC) measurement, Fluorescence measurement) require high NA optics.

In an optical flow cytometer combining fluorescence measurement and scattering measurement, mechanical design becomes extremely challenging because there is very little space to secure all the optics along three different walls of the flowcell.

As prior art, the document WO2019/058152 discloses an epi-fluorescence optical flow cytometer where the same lens is used for focalization of excitation beam and for detection of fluorescence light.

However, whatever the fluorescence measurement direction is (90 deg, epifluo, any other), an high NA lens is still required for collection of fluorescence. This leads to strong mechanical constraints around the flowcell: no room enough for multiple high NA optics.

The purpose of the present invention is to propose a compact optical flow cytometer for performing fluorescence measurement and scattering measurement.

Another purpose of the present invention is to removes the need for high N.A. forward scatter optics in an optical flow cytometer combining fluorescence measurement and forward scattering measurement.

The present invention also aims to ensure forward scatter measurement consistency.

The present invention also aims to solve mechanical conflicts around the flowcell.

SUMMARY

At least one of the above-mentioned purposes is achieved with an optical flow cytometer for fluorescence measurement and scattering measurement comprising:

- a non-coherent light source intended to generate an illumination beam,
- a beam truncation device comprising at least:
  - a first passage to let pass a first part of the illumination beam with a first divergence, this first part being dedicated to scattering measurements,
  - a second passage to let pass a second part of the illumination beam with a second divergence, this second part being dedicated to fluorescence measurements; the second divergence being greater than the first divergence; the first and second passages being separated by an area of the beam truncation device that stops illumination beam,
- at least a focalization lens to focus the first part and the second part of the illumination beam on a flowcell comprising an optical interrogation zone,
- the flowcell intended to contain particles flowing through the optical interrogation zone,
- a scattering detector for receiving light that is scattered from the first part of the illumination beam as a particle crosses the optical interrogation zone,
- a fluorescent detector for receiving fluorescent light emitted by the particle crossing the optical interrogation zone.

The beam truncation device according to the invention is not a beam splitter. The beam truncation device is used to modify the cross section of the illumination beam by truncating parts of it. Input and output beams cross sections geometry are not the same. On the contrary, through a beam splitter, input and output beams have the same cross section geometry.

The first part of the illumination beam is dedicated to illuminate the flowing particles to be able to accurately measure forward scatter notably around the optical axis.

The second part of the illumination beam is dedicated to illuminate the flowing particles via one or several directions different from the direction of the first part of the illumination beam. The arrangement according to the present invention create a gap between the first part of the illumination beam and the second part of the illumination beam. This gap is advantageously used to collect scattered light.

With the optical flow cytometer according to the invention, the scattering measurement is more accurate than in the prior art as the <5° detection (measured from illumination beam divergence half cone) is made without pollution of the second beam provided for fluorescence excitation. An accurate detection of forward scattering range defined by [0°, +5°] (measured from illumination beam divergence half-cone) allows for an accurate estimation of particle size inside the sample.

As the first part and the second part of the illumination beam are angularly separated, it becomes possible to measure forward scatter without disturbance of the second part of the beam that is dedicated to fluorescence excitation. Therefore, there is no need for a high numerical aperture (NA) optics for forward scattering measurement. The present invention relaxes mechanical constraints around the flowcell and reduces the cost of forward scattering collection optics. Indeed, optics used for scattering measurement can be smaller than those use in the prior art.

According to the invention, the scattering measurement may be performed simultaneously to the fluorescence measurement.

According to the invention, the non-coherent light source may be a LED, a filament lamp or an arc lamp.

Different sources at different wavelengths may be used. For example, extended non-coherent light source may be used at the ultraviolet, visible, or infrared wavelengths.

According to the invention, the second passage may have a cross section larger than the cross section of the first passage. Thus, the energy of the second part of the illumination beam is greater than the energy of the first part of the illumination beam.

The first passage lets pass the low divergence part of the illumination beam and the second passage lets pass the high divergence part of the illumination beam.

The divergence is considered to be the maximum angle of inclination of the rays which constitute the beams. The low divergence part of the illumination beam is closer to the optical axis than the high divergence part of the illumination beam.

The present invention permits to decouple the high energy, high divergence, illumination beam required for excitation of the fluorescent dye from the low energy, low divergence, illumination beam required for forward scattering measurements.

The low divergence beam is especially advantageous for forward scattering measurement because no high NA optics are required. Thus, the forward scattering collection optics can be moved away from the flowcell and low NA optics can be used, thus decreasing the cost of optics.

According to a preferred embodiment of the invention, the first passage may be, for example circular and, centered along the optical axis of the illumination beam.

The second passage may be circular and concentric with the first passage.

According to an embodiment of the invention, a second beam truncation device may be disposed after the flowcell, with respect to the optical propagation axis, to stop the first and/or the second part of the illumination beam.

The second beam truncation device may comprise holes just to let the whole or part of the scattered light pass.

According to a preferred embodiment of the invention, when the first passage has a circular cross section with a radius R, the radial distance between the first passage and the second passage may be greater than or equal to 0.2*R.

For example in the case where the first passage and the second passage are circular and concentric, the dimensions can be as follows:

First passage radius: [0; R]

Blocking radius: [R; n*R] with n>1.2

Second Passage radius [n*R; Rmax]

Preferably, the first passage has a cross section that is several times smaller than the cross section of the second passage so that to create a high power, strongly divergent, beam for fluorescence measurement and another low energy, low divergence, beam for consistent forward scattering measurement.

According to the invention, the beam truncation device may be located on either side of the focalization lens. In case focalization lens is a group of lenses, the beam truncation device may be located within that group of lenses. The beam truncation device does not need to be placed near the focalization lens. Several beam truncation devices might be used at different locations.

According to the invention, the beam truncation device may comprise at least one filter to be placed on the first passage and/or on the second passage in order to change the spectral characteristic of the first part of the illumination beam and/or the second part of the illumination beam respectively.

Filter type can be color glass (such as Schott BG12) or interference filter (such as Semrock 447/60 nm BrightLine).

According to the invention, the beam truncation device may comprise at least one polarizer to be placed on the first passage and/or on the second passage in order to change the polarization of the first part of the illumination beam and/or the second part of the illumination beam respectively.

Polarizer can a be of linear type (such as EdmundOptics Linear Polarizing Film ref: 19-003) or of circular type (such as Edmund Optics Cicular Polarizer ref: 88-095) or of waveplate type (such as EdmundOptics ref: 91-012).

According to the invention, the beam truncation device may comprise at least one another lens to be placed on the first passage and/or on the second passage in order to change the direction of the first part of the illumination beam and/or the second part of the illumination beam respectively.

For example, a small plano-convex lens such as EdmundOptics ref: 49-173 might be placed on the first passage.

The filter, the polarizer and the direction lens of the beam truncation device can be removable.

According to a preferred embodiment of the invention, the beam truncation device may comprise or consist in a diaphragm where the first passage and the second passage are holes.

The diaphragm realizes a segmentation with two holes and may be located near the focalization lens of the illumination beam. Those two holes allow distinguishing two beams:

- a first, low divergence, low energy, beam used for forward scattering measurements, and
- a second, high divergence, high energy, beam used for excitation of the fluorescent dye.

According to an embodiment of the invention, the first and/or the second beam truncation device may be a light blocking material deposited on a surface of a lens.

According to an embodiment of the invention, the cross section of the first passage and/or of the second passage may be circular, square, rectangular or random.

According to an embodiment of the invention, the cross section of the first passage and/or of the second passage may be centered or not centered with respect to the optical axis.

According to the invention, the focalization lens may be a single lens or a set of lenses.

According to an embodiment of the invention, the focalization lens may be designed to collect fluorescence light coming from the flowcell as well; this fluorescence light coming from the flowcell is then detected by the fluorescence detector in order to realize an epifluorescence measurement.

In this embodiment, the focalization lens is used for focusing the illumination beam in the sample and for collecting fluorescence light coming from the sample.

According to another embodiment of the invention, a fluorescence lens is disposed at 90° with respect to the optical axis in order to collect fluorescence light coming from the flowcell to the fluorescence detector for a 90° fluorescence measurement.

The present invention may advantageously comprise a fluorescence detection at 90 deg or an epifluorescence. In both cases, the present invention ensures a consistent forward scattering measurement.

According to another embodiment of the invention, a light collection module after the flowcell may be arranged to detect forward scatter, medium angle scatter or Axial Light Losses.

According to a preferred embodiment of the invention, the scattering detector may be arranged to detect light scattered by the flowing particle at angles within a range of [0°, 5°] measured from the divergence of the first part of the illumination beam. Other angle ranges may be used such as [0°, 10°] or [0°, 15°].

When the illumination beam is too divergent, light scattered at low angle with respect to the illumination beam is badly related to particle size. Thus, the accuracy of blood cell characterization by the optical transducer is severely worsen when illumination beam is strongly divergent.

The present invention is based on a beam segmentation stop that creates a high power, strongly divergent, beam for fluorescence measurement and another low energy, low divergence, beam for consistent forward scattering measurement.

According to an embodiment of the invention, a detection lens or group of lenses may be disposed after the flowcell to collect and focus light scattered by the flowing particle to the scattering detector.

The scattering detector may be directly placed on or close to the optical interrogation zone to directly detect the scattering light.

For the purpose of illustrating the invention, there is shown in the drawings a form that is presently preferred; it being understood, however, that this invention is not limited to the precise arrangements and instrumentalities.

BRIEF DESCRIPTION OF THE DRAWINGS

FIG. 3 is a schematic face view of a beam truncation device according to the invention;

FIG. 4 is a schematic face view of another beam truncation device according to the invention, and FIG. 5 is a schematic view illustrating the action of the beam truncation device on the illumination beam;

FIG. 6 is a schematic view of low angle scattering detection;

FIG. 7 is a sectional view of the scattered light and first part of illumination beam of FIG. 6.

DETAILED DESCRIPTION

Figure 1:
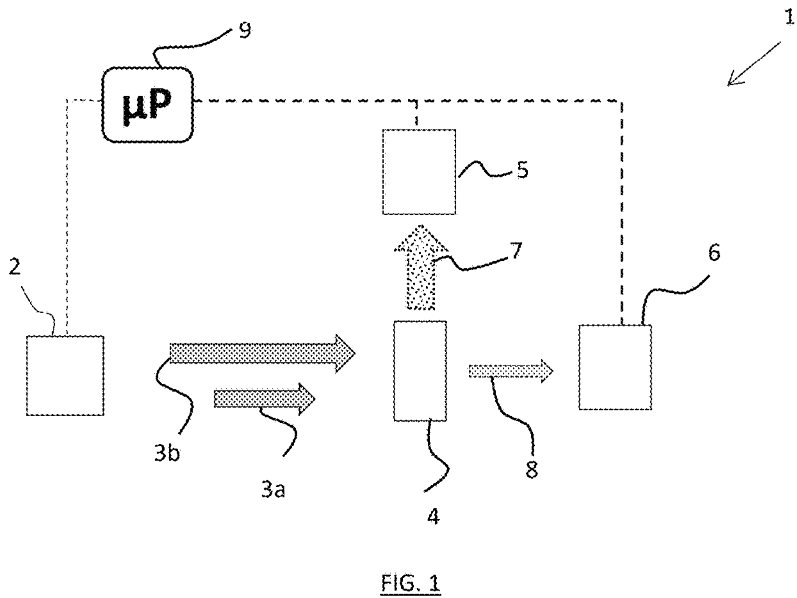
FIG. 1 is a global view illustrating components of an optical flow cytometer according to the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

Hereinafter, the present invention will be described in detail by explaining exemplary embodiments of the invention with reference to the attached drawings. Like reference numerals in the drawings denote like elements.

FIG. 1 is a global view illustrating components of an optical flow cytometer according to an exemplary embodiment of the present invention.

Referring to FIG. 1, the inventive optical flow cytometer 1 includes an illumination module 2 for generating two illumination beams 3*a* and 3*b* (from a single non-coherent light source) towards a flowcell 4 where particles such as blood cells are flowing. The optical flow cytometer 1 comprises electromotive or/and other means to drive and focus sample cells or blood cells into a flow which is surrounded, or not, by sheath fluid. The blood cells circulate through the flowcell 4.

The illumination beams 3*a* and 3*b* are focused and directed perpendicularly across the cells flow, and induces fluorescence of fluorescent sample particles or of their markers. The fluorescence light 7 generated by the blood cells is collected by the fluorescence measurement module 5.

The illumination beams 3*a* and 3*b* also induces scattering light 8 as blood cells pass the optical interrogation zone. The optical flow cytometer 1 comprises a scattering measurement module 6 provided for collecting scattering light 8 coming from the flowcell 4.

A processor unit 9 is provided to control the excitation module 2 for the excitation signal. The processor unit 7 also controls the fluorescence measurement module 5 and the scattering measurement module 6 in order to detect a direct and/or indirect scattering signal.

In the embodiment of FIG. 1, the scattering measurement module 6 is arranged at opposite side of the illumination module 2 and the fluorescence measurement module 5 is arranged at 90° from the optical axis of the illumination beam. Others arrangements can be done by including mirror, lens and/or beam splitter to deviate lights.

The present invention also concerns an epifluorescence configuration, not shown, where the excitation module 2 may comprise the fluorescence measurement module 5. In such a configuration, the same focalization lens is used to focalize excitation beam on the flowcell and to collect fluorescence light from the flowcell.

According to the invention, the illumination beam is segmented in a first part 3*a* of the excitation beam and in a second part 3*b* of the excitation beam. The first part 3*a* is preferably a low energy and low divergence beam.

The second part 3*b* is a high energy and high divergent beam.

The two beams 3*a* and 3*b* reach the sample at different directions so that the first part 3*a* and the second part 3*b* take different directions after passage through the sample.

With the present invention, after passage through the sample, there is a gap between the first part 3*a* of the illumination beam and the second part 3*b* of the illumination beam. This gap is therefore used to detect scattered light. This detection is considered consistent as there is no disturbing light of the second part 3*b* of the excitation beam.

For example, scattering measurement in the range of [0°, 5°] (from illumination beam divergence half-cone angle) can be made in this gap. Indeed, the 5 degrees are considered beyond the cross section of the first part 3*a* of the illumination beam. FIG. 6 shows the 5 degrees detection in the gap where there is no excitation beam of the second part 3*b*. The scattering measurement is thus more accurate. FIG. 7 is a sectional view of the scattered light and first part of illumination beam of FIG. 6. The first part 3*a* of the illumination beam is a circle surrounded by a crown representing the scattered light at 5°.

Figure 2:
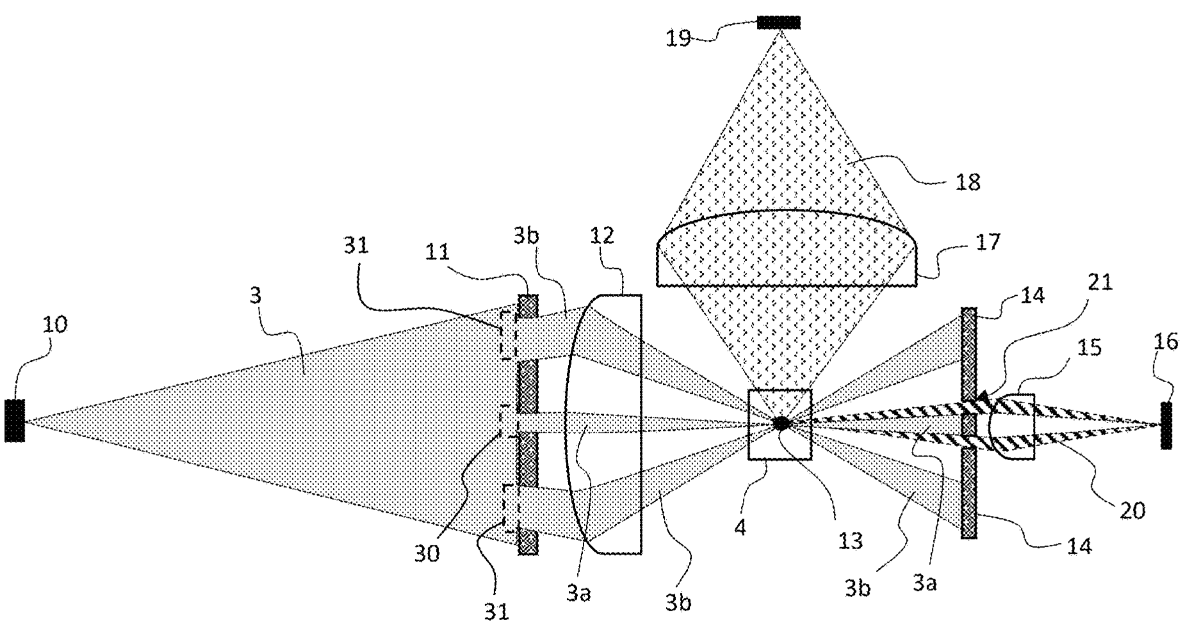
FIG. 2 is a schematic view illustrating the arrangement of optical components and the trajectory of the light in an example of optical flow cytometer according to the invention.

FIG. 2 shows optical details of the optical flow cytometer. The module 2 comprises an extended non-coherent source 10 such as an LED emitting an illumination beam 3 at 485 nm. A beam truncation device 11 stops some parts of the excitation beam 3 and comprises at least two passages to let pass two sub-beams: the first part 3*a* of the illumination beam and the second part 3*b* of the illumination beam.

FIG. 3 illustrates an example of beam truncation device according to the invention. It comprises two passages, holes or transparent material (at excitation wavelength) 11*a* and 11*b* to let pass the first part 3*a* of the illumination beam and the second part 3*b* of the illumination beam respectively. The other lights of the excitation beam are stopped by the non-transparent material 11*c*.

The first passage 11A is a circle hole at the center of the beam truncation device. Thus, the axial light of the illumination passes through this first passage 11*a* and constitutes the first part 3*a* of the illumination beam.

The second passage 11*b* has an annular shape concentric with the first passage. The area of the cross section of the second passage is larger than the area of the cross section of the first passage. The second part 3*b* of the illumination beam comprises a thicker beam of light than the first part 3*a*, which means higher energy. As the second passage is centered on first one, thus the second part 3*b* of the illumination beam is more divergent than the first part 3*a* of the excitation beam.

FIG. 4 illustrates another illumination of beam truncation device where the passages have different cross section. The first passage 11A is an ellipse hole out of the center of the beam truncation device. The second passage 11*b* is a square 50 separated from the first passage.

The beam truncation device according to the invention is not a beam splitter. Standard beam splitters do not involve any kind of truncation of the input beam, they can be used with any kind of light sources (coherent or not).

On the contrary, the beam truncation device according to the invention relies on truncation of the input beam to change the shape of its cross section. It is widely known by skilled person in optics that beam truncation involves strong diffraction patterns when coherent sources are used. For that reason, the beam truncation device according to the present invention is a segmentation Stop that is not compatible with the use of coherent sources such as lasers.

Back to FIG. 2, the first part 3*a* of the illumination beam and the second part 3*b* of the illumination beam are focused on the optical interrogation zone 13 inside the flowcell 4 by means of a lens 12. The sample is intended to circulate through the optical interrogation zone.

After the flowcell, first part 3*a* and second part 3*b* of the illumination beam are both blocked by a second truncation device 14. The device 14 has an annular hole 21 to allow light 20 scattered by the particle to reach the detector 16.

Since second part 3*b* of the illumination beam is strongly divergent, its angular location is well away from the annular hole of second truncation device 14. As scattering intensity rapidly vanishes with angle, the part 3*b* of the illumination beam only generates an extremely small scattering intensity through the annular hole of the second truncation device 14.

On the contrary, part 3*a* of the illumination beam is very close from annular hole of the second truncation device 14. So, the scattering contribution of part 3*a* of the illumination beam through annular hole of the second truncation device 14 is very high.

As a result, although part 3*b* of the illumination beam has a much higher power that 3*a*, this part 3*b* has no significant scattering contribution through annular hole of the second truncation device 14 because it is far away from it.

The beam truncation device may comprise at least one another lens 30, 31 to be placed on the first passage and/or on the second passage in order to change the direction of the first part of the illumination beam and/or the second part of the illumination beam respectively.

A detection lens 15 is used to direct rays scattered by the particle to a photodetector 16.

The lens 15 and the photodetector 16 are components of the scattering measurement module 6 of FIG. 1.

The passage of the first part 3*a* of the excitation beam and the second part 3*b* of the excitation beam through the optical interrogation zone 13 generates a fluorescence light. A fluorescent lens 17 focuses a portion 18 of the fluorescence light into a detector 19.

The fluorescent lens 17 and the detector 19 are components of the fluorescence measurement module 5 of FIG. 1.

With the arrangement of the present invention, the detection lens 15 can be a small one, which means less mechanical constraint to install big (high numerical aperture) focalization lens 12 and fluorescent lens 17.

FIG. 5 illustrates in detail the segmentation of the illumination beam. The first part 3*a* of the excitation beam and the second part 3*b* of the illumination beam are produced from a single source. The focusing lens makes all the first part 3*a* and the second part 3*b* converge in the flowcell thus generating the optical interrogation zone.

After focalization in the sample, the first part 3*a* remains isolated from the second part 3*b*.

The proposed innovation removes the need of high NA optics for forward scatter measurement. So it relaxes mechanical constraints around the flowcell and reduces the cost of forward scatter collection optics.

In the most efficient setup, the scattering dedicated beam is the low divergence central one. But the principle of proposed innovation still applies if scattering dedicated beams are not central The present invention allows improving scattering measurement by detecting scattering light that is not disturbed by the high intensity fluorescence excitation beam 3*b*. The scattering measurement is of better quality and small lens can be used to receive scattering light. It is thus possible to put around the flowcell a large lens with a high numerical aperture for illumination beam focalization and another large lens with a high numerical aperture for fluorescent detection.

The reduced size of the lens for collection of scattered rays frees up space for other lenses for illumination focusing and fluorescence collection.

Numerous variations and modifications will become apparent to those skilled in the art once the above disclosure is fully appreciated. It is intended that the following claims be interpreted to embrace all such variations and modifications.

The invention claimed is:

1. An optical flow cytometer for fluorescence measurement and scattering measurement comprising:

- a non-coherent light source intended to generate an illumination beam; and
- a beam truncation device comprising at least:
  - a first passage to let pass a first part of the illumination beam with a first divergence, the first part being dedicated to scattering measurements;
  - a second passage to let pass a second part of the illumination beam with a second divergence, the second part being dedicated to fluorescence measurements;

the second divergence being greater than the first divergence; the first and second passages being separated by an area of the beam truncation device that stops the illumination beam;

- at least a focalization lens to focus said first part and said second part of the illumination beam on a flowcell comprising an optical interrogation zone;
- the flowcell intended to contain particles flowing through the optical interrogation zone; the beam truncation device and the at least a focalization lens are optically positioned between the light source and the flowcell;
- a scattering detector for receiving light that is scattered from the first part of the illumination beam as a particle crosses the optical interrogation zone; and
- a fluorescent detector for receiving fluorescent light emitted by the particle crossing the optical interrogation zone.

2. The optical flow cytometer according to claim 1, characterized in that the non- coherent light source is an LED, a filament lamp or an arc lamp.

3. The optical flow cytometer according to claim 1, characterized in that the second passage has a cross section larger than the cross section of the first passage.

4. The optical flow cytometer according to claim 1, characterized in that the first passage is centered along the optical axis of the illumination beam.

5. The optical flow cytometer according to claim 1, characterized in that a second beam truncation device is disposed after the flowcell to stop the first and/or the second part of the illumination beam.

6. The optical flow cytometer according to claim 1, characterized in that, when the first passage has a circular cross section with a radius R, the radial distance between the first passage and the second passage is greater than or equal to 0.2*R.

7. The optical flow cytometer according to claim 1, characterized in that the beam truncation device comprises at least one filter to be placed on the first passage and/or on the second passage in order to change the spectral characteristic of the first part of the illumination beam and/or the second part of the illumination beam respectively.

8. The optical flow cytometer according to claim 1, characterized in that the beam truncation device comprises at least one polarizer to be placed on the first passage and/or on the second passage in order to change the polarization of the first part of the illumination beam and/or the second part of the illumination beam respectively.

9. The optical flow cytometer according to claim 1, characterized in that the beam truncation device comprises at least one another lens to be placed on the first passage and/or on the second passage in order to change the direction of the first part of the illumination beam and/or the second part of the illumination beam respectively.

10. The optical flow cytometer according to claim 1, characterized in that the beam truncation device comprises a diaphragm where the first passage and the second passage are holes.

11. The optical flow cytometer according to claim 1, characterized in that the cross section of the first passage and/or of the second passage is circular, square, rectangular or random.

12. The optical flow cytometer according to claim 1, characterized in that a fluorescence lens is disposed at 90° with respect to the optical axis in order to converge fluorescence light coming from the flowcell to the fluorescence detector for a 90° fluorescence measurement.

13. The optical flow cytometer according to claim 1, characterized in that the scattering detector is arranged to detect light scattered by the flowing particle at angles within a range of 0°-5° measured from the divergence of the first part of the illumination beam.

14. The optical flow cytometer according to claim 1, characterized in that a detection lens is disposed after the flowcell to collect and focus light scattered by the flowing particle to the scattering detector.

* * * * *